United States Patent [19]

Brown

[11] 4,391,847
[45] Jul. 5, 1983

[54] COATING FOR HALOGEN LAMPS

[75] Inventor: Rollin G. Brown, Chesterfield, Mo.

[73] Assignee: Edison International, Inc., Rolling Meadows, Ill.

[21] Appl. No.: 312,614

[22] Filed: Oct. 19, 1981

[51] Int. Cl.³ .......................... C03C 17/23; H01K 1/32
[52] U.S. Cl. ...................................... 427/106; 106/74; 106/84; 427/165; 427/169
[58] Field of Search .................. 427/106, 165, 169; 106/74, 84

[56] References Cited

U.S. PATENT DOCUMENTS 3,320,460  5/1967  Bouchard et al. ............... 427/106 X
3,552,992  1/1971  Self et al. ....................... 427/106 X
3,784,861  1/1974  Notelteirs et al. ............... 427/106 X Primary Examiner—James R. Hoffman
Attorney, Agent, or Firm—Jon Carl Gealow; James A. Gabala; Charles W. MacKinnon

[57] ABSTRACT

The invention relates to a composition for an opaque coating for minimizing the light output from selected areas of an incandescent lamp, particularly a halogen lamp. It has been discovered that a paste comprising a mixture of sodium silicate and manganese dioxide, when thinned with water to a desired consistency, then applied to the external surface of a halogen lamp bulb and properly dried, forms a tightly adhering, opaque coating of dark gray color which resists flaking and blistering at operational temperatures of the halogen lamp.

12 Claims, 1 Drawing Figure

U.S. Patent     Jul. 5, 1983     4,391,847
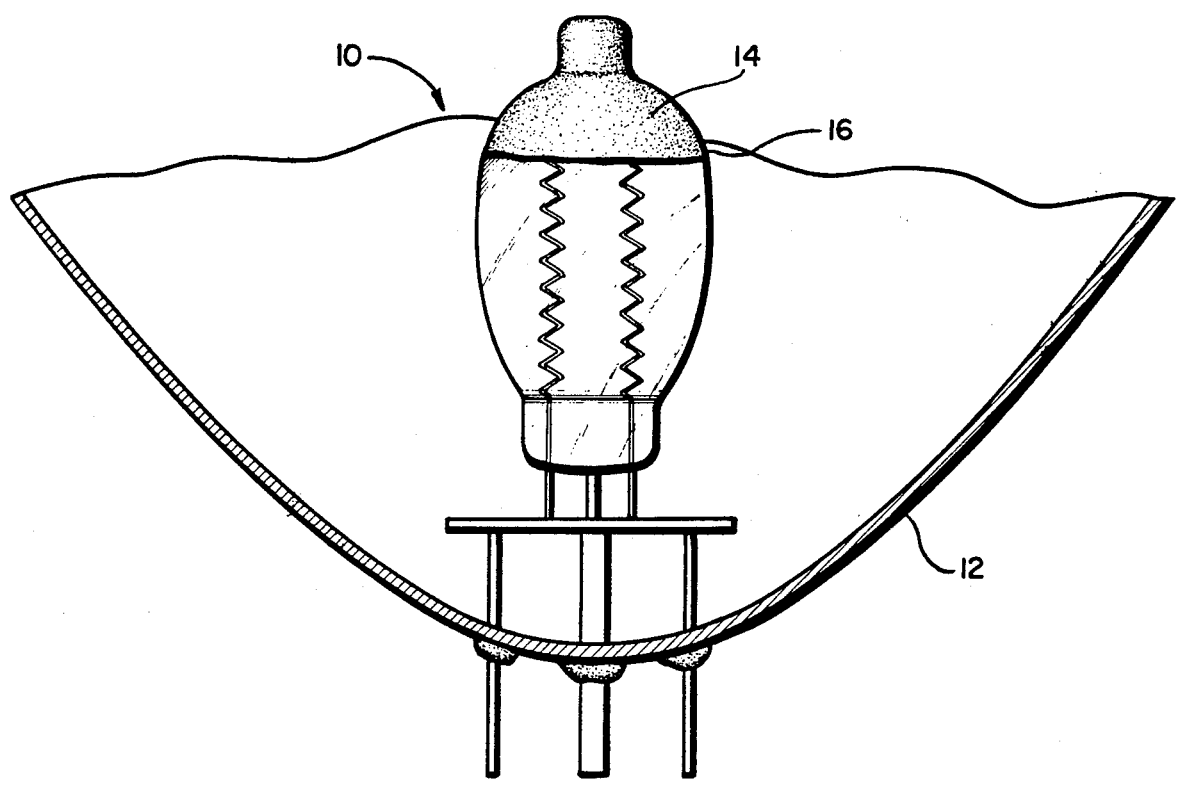

COATING FOR HALOGEN LAMPS

The invention relates to a composition for coating selected external surfaces of an incandescent lamp bulb, particularly a halogen lamp, for minimizing the light output at the selected areas of the lamp.

Halogen lamps are increasingly being used in conjunction with automobile headlamp assemblies because of the higher efficiency and brighter light output. It is also known that when the halogen lamp is utilized in the headlamp reflector, there are points or directions in which the light emitted from a filament is simply too bright to allow the headlamp designer to meet the appropriate specifications as to the light output from the headlamp. Typically, this need for masking of various portions of the light output has been met by the use of various filament shielding devices and/or coatings on the bulb itself. The halogen lamp operates at such a much higher temperature that opaque coatings which have been heretofore used satisfactorily exhibit undesirable flaking and/or blistering after being subjected to the higher operating temperatures.

It has been discovered that a novel, relatively simple inorganic coating comprising a mixture of two materials, sodium silicate and manganese dioxide of proportions as described below in accordance with the invention, will form a tightly adhering, opaque coating of dark gray color which resists flaking and blistering when applied to a bulb surface which will be heated to the operational temperature associated with halogen cycle lamps.

Further features and advantages of a coating according to the invention will be seen in conjunction with the description of FIG. 1.

FIG. 1 is a two-filament halogen lamp having a coating in accordance with the invention thereon.

In FIG. 1, a two-filament halogen lamp having a coating in accordance with the invention is shown generally at 10. The lamp 10 is typically mounted in a reflector 12 (shown partially). As shown in the FIGURE, a coating 14 according to the invention is applied to the upper portion of the bulb 16 so as to appropriately mask the light rays emanating directly from the lamp 10 itself which would not first strike the reflector. It will be appreciated that any selected area may be coated and that the chosen areas will depend both on the lamp shape and orientation.

To form a coating according to the invention, a mixture of sodium silicate and manganese dioxide is first mixed to form a heavy paste. For best results, it has been found that in the sodium silicate the ratio of $SiO_2$ to $Na_2O$ by weight should be approximately 2:1. It has been found that sodium silicate having ratios substantially above or below this ratio will either blister or flake after extended bulb operation.

The manganese dioxide desirably provides the opacity necessary for blocking the light transmission. For best results, the manganese dioxide has particle diameters of approximately 20 microns or less. It has been found that manganese dioxide with particle diameters greater than this, while still operative to block the light transmission, may provide a non-uniform coating.

It has been found that a proportion in the range of approximately 4:1 to approximately 5:1 by weight of manganese dioxide powder to sodium silicate results in proper opacity and has no effect on the resistance to blistering or flaking. The limitations on either side of the preferred ratio are created in that if there is too little manganese dioxide, the opacity is decreased and the light transmission may be insufficiently masked while if there is too great an amount of manganese dioxide, the desired resistance to blistering and flaking is not achieved. It is believed that the amount of manganese dioxide may vary within a range of plus or minus 5% of the preferred amount to maintain the desirable properties of a coating according to the invention.

After the sodium silicate and manganese dioxide have been mixed to a paste, the paste is thinned to the desired consistency for application to the surface of the bulb. While it is preferable that deionized water be used so as to allow a known composition of the mixture, it will be appreciated that tap water could be used. It is also evident that distilled water would also be appropriate to achieve the same results, but it has been found that such purity is not required for a coating according to the invention. It will be appreciated that the amount of water required depends upon the desired viscosity of the mixture desired to obtain a readily spreadable consistency.

Table I shows a specific composition of an embodiment of the mixture having the desired combination of properties:

TABLE I 16 parts by weight sodium silicate
(weight ratio $SiO_2/Na_2O=2$)
65 parts by weight manganese dioxide powder
(average particle diameter 20 microns)
19 parts by weight deionized water.

The ingredients were thoroughly mixed and applied to a portion of a bulb surface. The coating was then dried at 350° F. for 3 minutes.

It will be appreciated by those skilled in the art that different drying times will be required in accordance with differing quantities of water used in the mixture.

When the coating was dried the lamp was energized to full operating voltage and the coating remained tightly adhering to the bulb surface for an extended operational period.

It will be understood that the claims are intended to cover all changes and modifications of the preferred embodiment of the invention, herein chosen for the purpose of illustration, which do not constitute departures from the spirit and scope of the invention.

What is claimed is:
1. A composition for coating the bulb surface of an incandescent lamp, said composition including;
    (a) sodium silicate, said sodium silicate comprising silicon dioxide and sodium oxide in proportion by weight of approximately 2:1 and
    (b) manganese dioxide, said manganese dioxide being finely divided and in proportion by weight with respect to said sodium silicate in the range between approximately 4:1 and approximately 5:1.
2. The composition of claim 1 wherein said finely divided manganese dioxide has an average particle diameter of less than 20 microns.
3. A mixture for application as a coating on the bulb surface of an incandescent lamp comprising:
    (a) sodium silicate, said sodium silicate comprising silicon dioxide and sodium oxide in proportion by weight of approximately 2:1;
    (b) finely divided manganese dioxide, said manganese dioxide being in proportion by weight to said so- dium silicate in the range between approximately 4:1 and approximately 5:1; and (c) water for thinning said sodium silicate and manganese dioxide to a selected viscosity.

4. The mixture of claim 3 wherein said finely divided manganese dioxide has an average particle diameter of less than 20 microns.

5. The mixture of claim 3 wherein said water is deionized water.

6. The mixture of claim 5 wherein said deionized water comprises approximate 19% by weight of the mixture.

7. A composition for coating an external surface portion of a halogen lamp bulb for substantially blocking the light emitted in the direction of the coated portion thereof comprising:

(a) sodium silicate, said sodium silicate comprising silicon dioxide and sodium oxide in proportion by weight of approximately 2:1;

(b) finely divided manganese dioxide, said manganese dioxide being in proportion by weight to said sodium silicate in the range between approximately 4:1 and approximately 5:1; and (c) water for thinning said sodium silicate and manganese dioxide to a selected viscosity.

8. The composition of claim 7 wherein said water is deionized water and comprises approximately 19% by weight of the mixture.

9. A composition for coating an external surface portion of a halogen lamp bulb for substantially blocking the light emitted in the direction thereof comprising:

(a) 16 parts by weight sodium silicate, said sodium silicate comprising silicon dioxide and sodium oxide in a ratio by weight of approximately 2:1;

(b) 65 parts by weight manganese dioxide powder, said powder having average particle diameter less than or equal to 20 microns; and (c) 19 parts by weight deionized water.

10. A method for coating an incandescent lamp bulb comprising the steps of:

(a) mixing sodium silicate and finely divided manganese dioxide to a paste, said sodium silicate comprising silicon dioxide and sodium oxide in proportion by weight of approximately 2:1, said finely divided manganese dioxide being in proportion by weight to said sodium silicate in the range between approximately 4:1 and approximately 5:1;

(b) thinning said paste with water to a selected viscosity;

(c) applying the thinned paste mixture to a selected portion of the external surface of an incandescent lamp bulb; and (d) drying said thinned paste to form a coating on said selected portion.

11. The method of claim 10 wherein said incandescent lamp bulb is a halogen lamp bulb.

12. The method of claim 10 wherein the thinned paste mixture comprises:

(a) 16 parts by weight sodium silicate, said sodium silicate comprising silicon dioxide and sodium oxide in a ratio by weight of approximately 2:1;

(b) 65 parts by weight manganese dioxide powder, said powder having average particle diameter less than or equal to 20 microns; and (c) 19 parts by weight deionized water.

* * * * *